United States Patent Office 2,712,279
Patented July 5, 1955

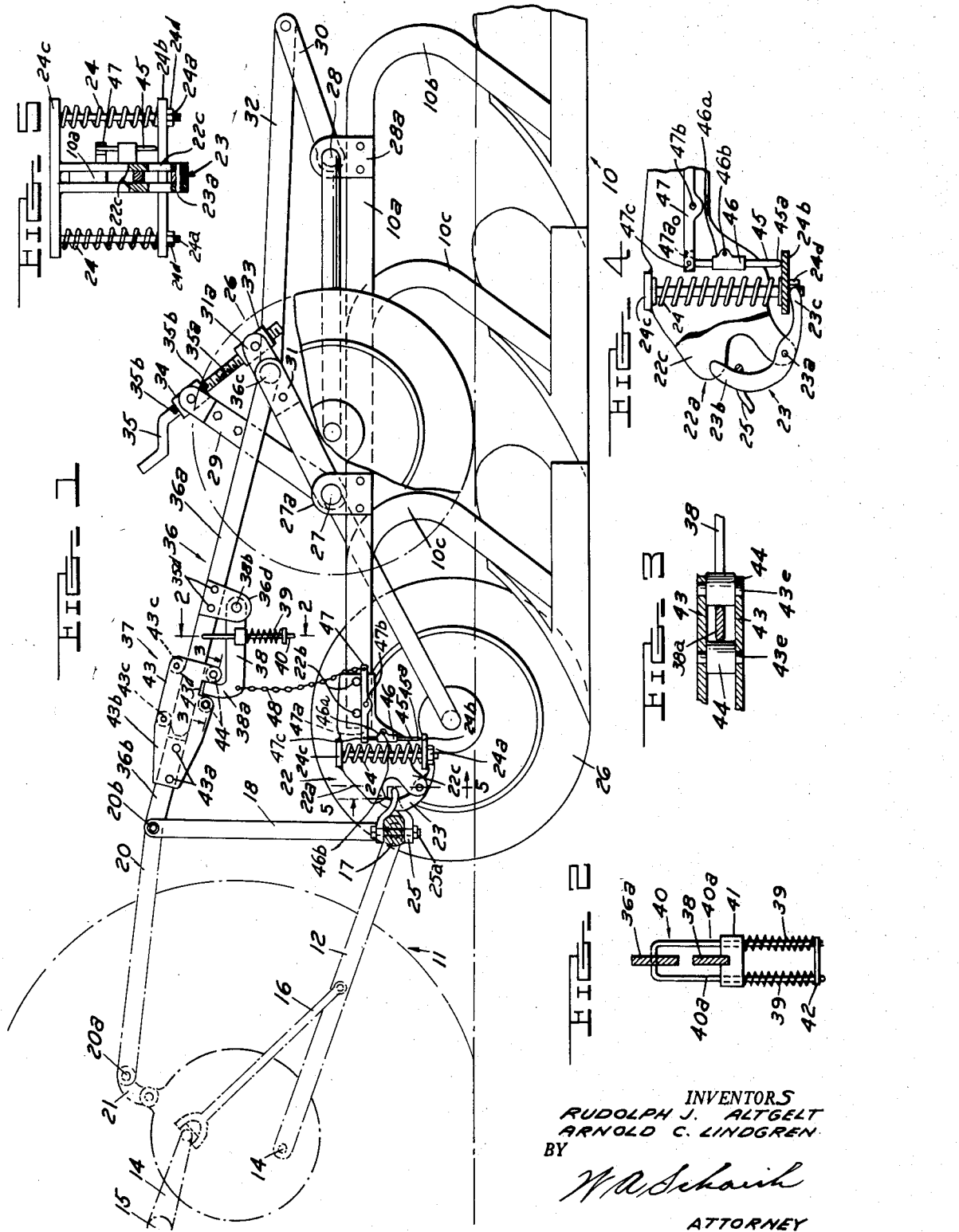

2,712,279

SAFETY RELEASE FOR IMPLEMENTS

Rudolph J. Altgelt, South Bend, Ind., and Arnold C. Lindgren, Berkley, Mich., assignors, by mesne assignments, to Ford Motor Company, Dearborn, Mich., a corporation of Delaware Application April 6, 1951, Serial No. 219,648

1 Claim. (Cl. 97—47.28)

This invention relates to a safety release for tractor towed implements and particularly for implements which have ground working elements.

In working the ground with implements towed behind a tractor, as with multiple bottom plows for example, there is always the danger of striking obstructions such as stumps or rocks which would damage either the earth working elements of the plow or the plow frame itself. With horse drawn plows or with slow speed, low powered tractors, striking an obstruction in the ground with the plow was not such a serious problem as generally the tractor would stall before severe damage resulted. However, with today's more powerful and higher speed tractors, greatly increased working speeds and draft effects are utilized and hence some protective measures must be taken to prevent damage to the earth working elements of the implement drawn behind the tractor.

Many of today's tractors have a power-operated draft linkage which not only permits various implements to be towed behind the tractor but also permits a large proportion of such implements to be transported in a raised position off of the ground or at least elevated to a carrying position on transporting wheels. In any event, where the tractor has a pair of trailing power-operated draft links and a top or upper link on which a draft frame is mounted, the problem of releasing a ground working implement mounted on the draft linkage substantially instantaneously upon striking an obstruction in the ground is greatly complicated. When using the above mentioned draft frame, the implement is generally connected to both the upper and lower portions of such draft frame and therefore both of the connecting members must be simultaneously separated from the draft frame when the implement encounters an obstruction in the ground.

Accordingly, it is an object of this invention to provide an improved safety release for a plow which permits rapid and automatic release of the plow from the tractor in the event a relatively immovable object is struck by the plow.

Another object of this invention is to provide an improved release mechanism for a so called "lift type" implement which is mounted on a plurality of power-lifted trailing draft links of a tractor of well-known make for effecting rapid release of the implement from the tractor upon encountering an obstruction in the ground.

The specific nature of this invention, as well as other objects and advantages thereof, will become apparent to those skilled in the art from the following detailed description, taken in conjunction with the one sheet of drawings on which, by way of preferred example only, is illustrated one embodiment of this invention.

On the drawings:

Fig. 1 is a side elevational view of a multiple base plow (incorporating an improved release mechanism constructed in accordance with this invention) shown attached to the power-lifted trailing draft links of a tractor.

Fig. 2 is an enlarged detail view taken along the plane 2—2 of Fig. 1.

Fig. 3 is an enlarged detail view taken along the plane 3—3 of Fig. 1.

Fig. 4 is an enlarged detail view of the overload release hitch mechanism.

Fig. 5 is an enlarged sectional view taken along plane 5—5 of Fig. 1.

As shown on the drawings:

This invention is preferably utilized with a relatively large earth working implement such as a multiple base plow which is capable of being attached to the trailing draft links of a tractor of well-known make, yet of such weight as to preclude its being bodily lifted by such linkage, hence the weight of the plow is largely carried by a pair of transporting wheels respectively mounted on opposite sides of the plow frame by a pair of transverse axles. An implement hitch of this general type is described and claimed in the copending application of Rudolph J. Altgelt entitled Lift Hitch for Implements, Serial No. 213,580, filed March 2, 1951, now Patent No. 2,673,505 and assigned to the assignee of this application. The plow frame is connected at its front end to a transverse drawbar frame supported by the trailing ends of the power-lifted hitch links and by the usual top link on the tractor. An overload "quick" release device is incorporated in the connection between the drawbar frame and the plow frame. A two piece upper link is respectively pivotally connected at its ends to the drawbar frame and a suitable point on the plow such as a pair of interconnected cranks on the axles. The two piece link is joined by a releasable connection and comprises a latch member pivoted to one half of such two piece link. The latch cooperates with a notch provided in the releasable connection to lock the two pieces together. The latch is normally held in locked relationship by a spring. A flexible connecting member connects the latch with the overload "quick" release mechanism so that when the overload release mechanism is released by the occurrence of an overload, the two piece link member will be separated substantially simultaneously and hence completely free the implement from the tractor.

In Fig. 1, there is shown a plow 10 secured to a tractor 11. Tractor 11 is of a well-known make having a pair of laterally spaced hitch links 12 pivoted to the tractor rear axle housing 13 as at 14. Hitch links 12 are vertically liftable by a pair of rocker arms 14 mounted on the ends of a transverse shaft 15. Shaft 15 is rotated by the conventional built-in hydraulically operated mechanism (not shown). A pair of connecting links 16, each respectively secured at its ends to the rocker arms 14 and to a medial portion of hitch links 12, effect the raising of such hitch links. As this construction is all conventional, further description thereof is believed unnecessary.

The trailing ends of hitch links 12 transversely support a drawbar 17 and a so-called upright A-frame 18 is pivotally mounted on drawbar 17. The A-frame 18 and drawbar 17 thus form what may be called a draft frame. The upper end of A-frame 18 is bifurcated (not shown) and a tractor top link 20 pivotally connected to a rocker arm 21 provided on tractor 11 as shown at 20a has its trailing end pivotally connected between the bifurcated portion of A-frame 18 by a transverse pin 20b.

The releasable hitch constructed in accordance with this invention may be utilized with any ground working implement which can be conveniently mounted on the trailing draft links of the tractor or at least partially carried thereby. For purposes of illustration, Fig. 1 illustrates a multiple base plow 10 to which the improved releasable hitch of this invention can be readily applied. Plow 10 has the usual main plow beam 10a having a depending end portion 10b to which the plow base is secured. A plurality of secondary plow beams 10c are suitably secured in laterally and forwardly spaced relationship to the main beam 10a.

On the forward end of plow beam 10a there is secured an overload release hitch mechanism 22 (Fig. 1). Essentially the overload release hitch mechanism 22 comprises a housing 22a having a pair of laterally spaced side plates 22c. The rear ends of side plates 22c are respectively secured by rivets 22b to opposite sides of the forward end of beam 10a. A latch 23 is pivotally mounted by a pin 23a to the lower forward portion of housing 22. Latch 23 has an upright arcuate hook portion 23b for a purpose to later appear and a rearwardly projecting arm portion 23c, the end of which is slightly upturned. The upturned end of arm portion 23c contacts a transverse bar 24b to compress a pair of helical springs 24. Springs 24 respectively surround a pair of rods 24a. Rods 24a have their upper extremities suitably secured to the ends of a transverse bar member 24c. Bar 24c is welded to the top of housing 22a as best shown in Fig. 1. The lower ends of springs 24 rest on bar 24b and such bar has a pair of apertures spaced to receive the ends of rods 24a. The lower extremities of rods 24a are threaded and a pair of nuts 24d respectively screwed on to rods 24a slidably secure bar 24b. Springs 24 are initially compressed by tightening nuts 24d to preload such springs. A twisted shackle 25 is secured to drawbar 17 by a vertical pin 25a and the looped end of shackle 25 is engageable by latch end portion 23b whereby the forward end of plow 10 is attached to drawbar 17. Whenever the draft effort exerted on latch 23 exceeds a predetermined value sufficient to compress springs 24, latch 23 is tripped and the draft connection broken.

The frame of plow 10 is partially supported by a pair of wheels 26 respectively mounted on opposite sides of plow 10 on crank-like end portions of transverse axles 27 and 28. The axles 27 and 28 are respectively journaled in suitable bearing brackets 27a and 28a. The axles 27 and 28 have lever arms 29 and 30 respectively welded thereto. An arm 31 is rotatably mounted on axle 27 and such arm is connected to lever 30 by a link 32. A bracket 31a is suitably secured to the upper end of arm 31 thus defining a forked end in which is pivotally mounted a sleeve 33 having a threaded bore (not shown). A similar sleeve 34 is similarly mounted on lever 29, such sleeve, however, having an unthreaded axial bore. A crank 35 having a threaded end portion 35a is inserted in sleeves 33 and 34, the threaded end 35a of crank 35 cooperating with the threaded interior of sleeve 33. Crank 35 is rotatably secured within sleeve 34 by a pair of transverse pins 35b which effectively prevent axial movement of such crank.

A forwardly projecting release link 36 comprising a two piece member having a rearward portion 36a and a forward portion 36b has its rear end pivoted to the upper end of arm 31 by a pin 36c. The front end of forward portion 36a of link 36 is pivotally connected to the top of A-frame 18 by the transverse pin 20b. The two link portions 36a and 36b of link 36 are connected together by a releasable device 37 to be presently described. The transporting wheels 26 are provided to partially carry plow 10 when hitch links 12 are raised to effect rotation of levers 29 and 30 which thereby rotates axles 27 and 28 to lift the plow frame up to a transporting position. Plow 10 may be readily leveled by the crank 35 which adjusts the angular relationship of the two axles 27 and 28. For a more detailed description of the plow lifting device and the manner of leveling such plow, reference may be had to the above identified copending application.

On the rear portion 36a of link 36, there is provided a pair of depending brackets 36d secured thereto by a pair of rivets 35d. A latch 38 having a hook portion 38a is pivotally secured at its other end by a transverse bolt 38b between the depending brackets 36d. Latch 38 is normally biased against the underside of link portion 36a by a pair of springs 39. Springs 39 respectively surround the depending arms 40a of a U-shaped rod 40. The bight portion of such rod is transversely mounted within a suitable aperture in link portion 36a just forwardly of brackets 36d. Each of the arms 40a passes through a block-like spring seat 41 which abuts the underside of latch 38. A spring retainer 42 mounted on the upset lower ends of arms 40a retains springs 39 on U-shaped rod 40.

A pair of plates 43 are secured to opposite faces of the forward link portion 36b by a pair of rivets 43a. Such plates are of generally rectangular configuration having a tapered forward end as indicated at 43b. Plates 43 overlie link portion 36a when such link is in the position shown in Fig. 1 and such plates are maintained in spaced relationship by suitable spacers indicated at 43c and provided in the upper corners of such plates. Spacers 43c also function to maintain rear link portion 36a in alignment with forward link portion 36b. The plates 43 define, in effect, a socket to receive the forward end of link 36a. A transverse notch 43d is provided in the bottom edge of each of plates 43 in opposed relationship and a pair of cylindrical spacer blocks 44 are respectively mounted on the opposite sides of notches 43d by transverse pins 43e, as best shown in Fig. 3. The hook shaped end 38a of latch 38 fits within the notches 43d and is held therein by springs 39 acting against latch 38 and thereby yieldingly secure the two link portions 35a and 35b together.

Latch 38 is operatively connected to overload release latch 23 in the following manner: A rod-like plunger 45 is vertically and slidably supported within a bearing sleeve 46 formed on the side of housing 22a. Sleeve 46 has an apertured integral lug portion 46a to permit such sleeve to be pivotally secured by a suitable bolt 46b to housing 22a. The lower extremity of plunger 45 is rounded as shown at 45a and such rounded end rests on the transverse bar 24b.

A horizontally disposed latch tripping bar 47 has its medial portion pivoted by a suitable pin 47b to housing 22a. The forward end of tripping bar 47 is bifurcated as shown at 47a and the upper end of plunger 45 is pivotally secured by a suitable pin 47c within such bifurcation. A chain 48 or other flexible tension member has its ends respectively secured to the forward end of latch 38 and the rear end of tripping bar 47.

When plowing with plow 10, the link portions 36a and 36b are joined by the release mechanism 37 as shown in Fig. 1. When any of the plow bottoms encounter an obstruction in the ground or when the draft becomes excessive, the overload release mechanism 22 provided on the forward end of plow beam 10a is operated to release latch 23. Simultaneously plunger 45 is forced upwardly by the compression of springs 24 to effect tensioning of chain 48 by rotating tripping bar 47 in a clockwise direction which pivots latch end 38a downwardly out of engagement with notches 43d provided in the safety release mechanism 37. When latch 38 is disengaged therefrom, the two piece link member 36 separates and slides out of the socket defined by spaced apart plates 43, whereupon the plow 10 is left in the ground and the tractor 11 proceeds forwardly without the plow, so that damage to such plow is prevented. The tractor operator may then return and either remove the obstruction in the ground or reconnect the plow and raise the plow above such obstruction.

If, for any reason, the overload release mechanism 22 fails to effect unlatching of latch 38 after release of latch 23 from shackle 25, the link 36 will then rotate the rear end of the plow 10 upwardly, thereby increasing the angular distance between plow beam 10a and link 36. As the lower end of link 48 is still secured to lever 47, latch 38 will then be pivoted downwardly or in a counter clockwise direction to effect separation of the two piece link 36. Thus complete separation of the plow from the draft frame is assured even though overload release mechanism 22 fails to release latch 38 as it normally should.

From the foregoing description it is thus clearly apparent that there is here provided a release mechanism for a "lift type" implement which, while of relatively simple construction, will effect immediate release of the implement from the tractor to prevent damage to the implement upon encountering an obstruction in the ground.

It will, of course, be understood that various details of construction may be varied through a wide range without departing from the principles of this invention and it is, therefore, not the purpose to limit the patent granted hereon otherwise than necessitated by the scope of the appended claim.

We claim:

For use for a tractor having a pair of power lifted laterally spaced hitch links and a top link pivoted to the tractor, the combination of a vertically disposed hitch frame mountable on the hitch links and the top link, an implement frame having a crank axle supported ground wheel, draft overload release means connecting said implement frame to the lower portions of said hitch frame, a separable link member operatively connecting said crank axle and the top portions of said hitch frame and overlying said implement frame, a vertically shiftable spring pressed latch carried by said separable link member and normally retaining said separable member in unitary condition, and a force transmitting element operatively connecting said latch and said implement frame, whereby release of said draft overload release means without release of said latch produces vertical displacement of said separable link member relative to said implement frame sufficient to release said latch and thereby separate said separable member.

References Cited in the file of this patent

UNITED STATES PATENTS

| | | |
|---|---|---|
| 2,292,961 | Mott | Aug. 11, 1942 |
| 2,369,436 | Court | Feb. 13, 1945 |
| 2,430,696 | Acton | Nov. 11, 1947 |
| 2,505,609 | Ego | Apr. 25, 1950 |
| 2,573,221 | Romig | Oct. 30, 1951 |
| 2,608,145 | Knapp | Aug. 26, 1952 |